(12) United States Patent
Wu et al.

(10) Patent No.: US 12,056,107 B2
(45) Date of Patent: Aug. 6, 2024

(54) MANAGING VERTEX LEVEL ACCESS IN A GRAPH VIA USER DEFINED TAG RULES

(71) Applicant: TigerGraph, Inc., Redwood City, CA (US)

(72) Inventors: Mingxi Wu, San Mateo, CA (US); Victor Lee, Alliance, OH (US)

(73) Assignee: TigerGraph, Inc., Redwood City, CA (US)

( * ) Notice: Subject to any disclaimer, the term of this patent is extended or adjusted under 35 U.S.C. 154(b) by 0 days.

(21) Appl. No.: 17/898,113

(22) Filed: Aug. 29, 2022

(65) Prior Publication Data
US 2023/0067107 A1 Mar. 2, 2023

Related U.S. Application Data

(60) Provisional application No. 63/238,550, filed on Aug. 30, 2021.

(51) Int. Cl.
*G06F 16/22* (2019.01)

(52) U.S. Cl.
CPC ................ *G06F 16/2228* (2019.01)

(58) Field of Classification Search
CPC .... G06F 16/285; G06F 16/35; G06F 16/9024; G06F 16/26; G06F 16/906
See application file for complete search history.

(56) References Cited

U.S. PATENT DOCUMENTS

| | | | |
|---|---|---|---|
| 2013/0054601 A1* | 2/2013 | Whitlock | G06F 16/2291 707/E17.046 |
| 2019/0384926 A1* | 12/2019 | Wu | G06F 21/6218 |

* cited by examiner

*Primary Examiner* — Hau H Hoang

(57) ABSTRACT

Systems, methods, and software to manage tags in association with vertices of a graph. In one implementation, a graph management system identifies a request to tag vertices in the graph, wherein the request indicates one or more attributes to qualify for the tag as part of a conditional expression. The graph management system further identifies vertices in the graph with the one or more attributes. Once identified, the graph management system assigns the tag to the vertices wherein the tag comprises an attribute assigned to the identified vertices.

18 Claims, 6 Drawing Sheets

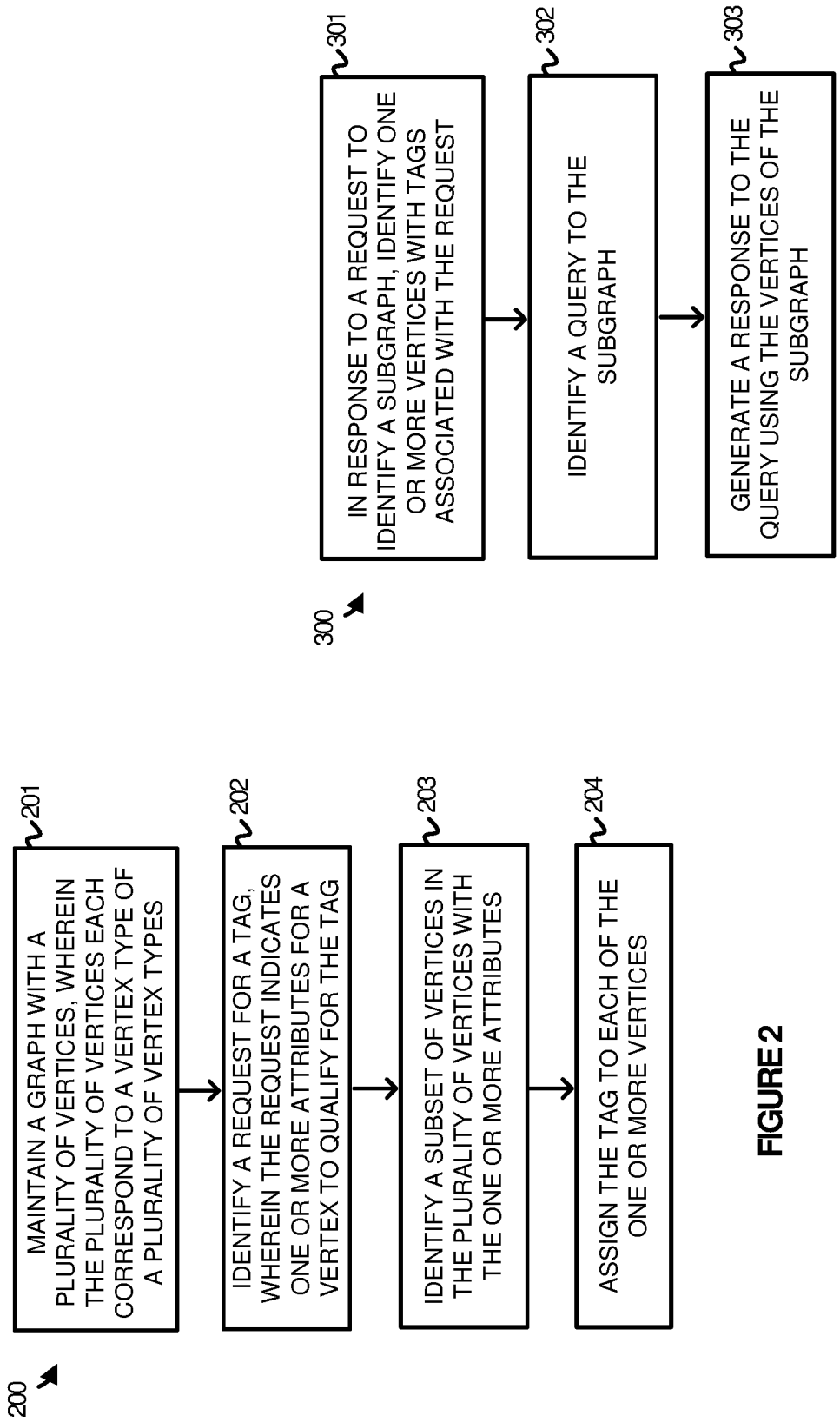

MANAGING VERTEX LEVEL ACCESS IN A GRAPH VIA USER DEFINED TAG RULES

RELATED APPLICATIONS

This application hereby claims the benefit of and priority to U.S. Provisional Application No. 63/238,550, titled "MANAGING VERTEX LEVEL ACCESS IN A GRAPH VIA USER DEFINED TAG RULES," filed Aug. 30, 2021, which is hereby incorporated by reference in its entirety.

BACKGROUND

Relational databases generally store data in one or more tables with rows and columns for the various data items. In contrast, graph databases represent data in the form of vertices and edges, where a vertex represents an entity or data instance, and an edge represents a relationship of some type between any two vertices. Graph database representations allow data modeling that more closely parallels the real world and provides a visual representation of connected data. In general, a graph is a set of objects, called vertices, nodes, or points, which are connected by links, called lines or edges. The edges establish relationships (connections) between the vertices. Graphs can be directed or undirected. In an undirected graph, an edge from point A to point B is the same as a line from point B to point A. In a directed graph, the two directions are treated as distinct directed edges.

Although graph databases provide an efficient manner for storing data, difficulties can arise in efficiently responding to queries of the graph. As graphs expand with a greater quantity of vertices and edges, queries to the graphs may consume additional processing and time resources to search the graph and respond to the queries. These difficulties are often compounded when each of the vertices includes multiple searchable attributes, such as names, ages, birthdays, or other similar attributes, requiring a system to traverse the vertices of the graph to identify vertices (or edges) with a relevant attribute or attributes associated with the query.

SUMMARY

Provided herein are systems and methods to manage vertex level access in a graph via user defined tag rules. In one implementation, a graph management system is configured to identify a request to add a tag to a subset of vertices in a plurality of vertices in a graph, wherein the request indicates one or more attributes to qualify for the tag, and wherein the plurality of vertices comprise a plurality of vertex types. The graph management system is further configured to identify the subset of vertices in the graph with the one or more attributes, and assign the tag to the subset of vertices, wherein the tag comprises an attribute associated with the subset of vertices.

In some examples, the request may indicate a Boolean function or conditional expression that dictates the one or more attributes that qualify for the tag. The Boolean function can include an AND operation that requires multiple attributes to qualify for a tag, an OR operation that permits a vertex with a first attribute or a second attribute to qualify for a tag, or can comprise some other Boolean functionality, including combinations thereof.

In some examples, in addition to or in place of the Boolean logic for applying tags, a tag can be applied using any other query to the graph, including relationships between vertices (e.g., edge types), distance from one or more other vertices (e.g., number of hops), or some other mechanism.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 2 illustrates an operation of a graph management system to tag vertices in a graph according to an implementation.

FIG. 3 illustrates an operation of a graph management system to identify subgraphs based on tags and respond to queries using subgraphs according to an implementation.

DETAILED DESCRIPTION

Figure 1:
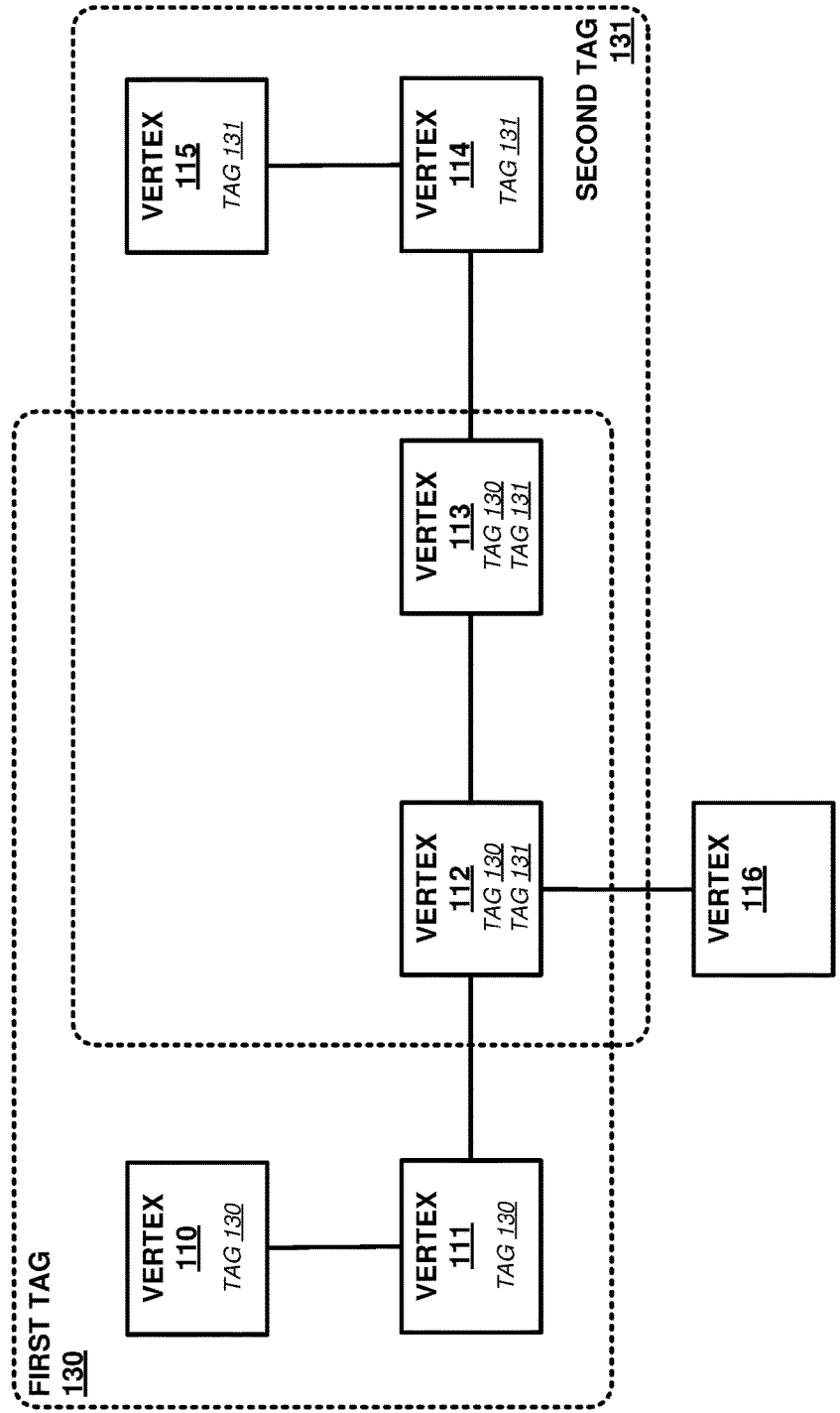
FIG. 1 illustrates a graph with tagged vertices according to an implementation.

FIG. 1 illustrates a graph 100 with tagged vertices according to an implementation. Graph 100 includes vertices 110-116, wherein vertices 110-113 are tagged with a first tag 130 and vertices 112-115 are tagged with a second tag 131. Vertices 110-116 may represent vertices of different types that represent different data types. These different data types may include data types for social networks, transaction graphs demonstrating various transactions, organizational data types (e.g., employee, project, etc.), or some other separation of data types. For example, a social network graph may include a vertex type that represents users of the social network, a vertex type that represents posts by the user in the social network, or some other vertex that represents information for a social network.

In some implementations, a graph management system may generate graph 100 based on input provided by an organization. The graph may represent a social network, employees of an organization, or some other information. Each of the vertices in the graph may be associated with a vertex type that corresponds to a data type for the graph. For example, in graph 100, vertices 110-114 may represent users of a social network, while vertices 115-116 may represent posts associated with the social network. Here, vertices 110-113 are associated with tag 130 and vertices 112-115 are associated with tag 131. To tag each vertex 110-116, an administrator associated with graph 100 may define the tags and one or more attributes that are required for a vertex to qualify for the tag. For example, a tag may define that any user of a social network can qualify for a tag if they are from a particular location (or include a particular location attribute). Additionally, the same tag may indicate that a post may qualify for the same tag if a geolocation associated with the post is from the same location. Thus, even if vertices are of a different type, the vertices may share the same tag.

In some implementations, the vertices may be tagged after they are added to graph 100. In other examples, the vertices may be tagged as they are imported into the graph. For example, files may be processed to import vertices in the graph. Prior to the import, an administrator may indicate a type for the vertices, attributes to be imported as part of the vertices, tags to be applied to the vertices, or some other information. In tagging the vertices, the administrator may indicate that all vertices are tagged with the same tag, may indicate that vertices with one or more attributes are tagged, or may provide some other definition for tagging the imported vertices. For example, for every person imported from a file, the administrator may desire to tag the person as "important" when the user is from one or more cities. As the file is imported and vertices are added to the graph to represent the persons in the file, a tag may be added to the attributes associated with a vertex when the person is identified as from one of the requested cities. In some examples, the one or more attributes can be defined as part of a Boolean structure or relationship structure of multiple attributes, the Boolean structure can permit OR, AND, NOR, or some other conditional functionality for attributes in a graph, including combinations thereof. For example, a vertex can be included if it includes a first attribute or a second attribute.

Once tags are added to the vertices, subgraphs can be created or identified using the tags. The subgraphs may be identified or generated by an administrator selecting one or more of the tags (or types of vertices) for the subgraph. For example, an administrator may select a subgraph for vertices that have both tag 130 and tag 131. In response to the request, vertices 112-113 may be assigned to the graph for including both tags. Additionally, the edge between vertices 112-113 may be included in the graph because both ends of the edge are included in the subgraph. After a subgraph is generated using the tags, permissions to access the subgraph may be allocated to different users of the organization. The users may correspond to different divisions of a company (e.g., legal, human resources, and the like), may correspond to different requirements of the users, or may correspond to some other user allocation. Once a user has access to a subgraph, queries can be generated to the subgraph, wherein the query will only use attributes or information associated with the vertices and edges in the subgraph. In some examples, a user may not use the tags in the query but may use other attributes associated with vertices and edges. As an example, a query may request the shortest path between two users.

FIG. 2 illustrates an operation 200 of a graph management system to tag vertices in a graph according to an implementation. The steps of operation 200 are referenced parenthetically in the paragraphs that follow with reference to elements of graph 100 of FIG. 1.

In operation 200, a graph management system maintains (201) a graph with a plurality of vertices, wherein each of the vertices correspond to a vertex type of a plurality of vertex types. For a social network, vertex types may include a user vertex type, a comment vertex type, a picture vertex type, or some other vertex type related to the information for the social network. Other types of graphs may represent objects for a company, products, transactions, or some other information. As the graph is maintained, operation 200 further identifies (202) a request for a tag, wherein the request indicates one or more attributes in the plurality of vertices. In some implementations, the request may require that a vertex include at least one of a first attribute and one or more additional attributes. In other implementations, the request may require that the vertex include multiple attributes. In some examples, the attributes may not correspond to a specific vertex type. For instance, a request may indicate that user vertices are tagged as "important" when the user has a first attribute and may further indicate that post vertices are tagged as "important" when the post is associated with a second attribute. Thus, even when vertices are of a different type, the vertices can be allocated the same tag by the graph management system. In some implementations, the specification of the one or more attributes can be written as a conditional expression, wherein the conditional expression can indicate AND operations, OR operations, NOR operations, or some other conditional operation. Using the previous example, a vertex will qualify for a tag if the vertex is a user vertex and includes a first attribute OR if the vertex is a post vertex and includes a second attribute.

In response to the request, operation 200 further identifies (203) a subset of vertices in the plurality of vertices with the one or more attributes from the request, and assigns (204) the tag to each of the qualifying vertices in the subset. In some implementations, the tag may be assigned as part of an attribute field for the identified vertices. The tag may comprise a set of bits or data that correspond to the tag in the vertex.

In some examples, prior to allocating a tag to vertices in a graph, one or more of the vertex types in the graph must be indicated to be taggable. Specifically, while some of the vertex types of a graph can be taggable, other vertex types may be specified as untaggable. Thus, when a request is generated to assign a new tag, the vertices associated with vertex types that are untaggable can be ignored in the processing and assignment operations. In some examples, the request may indicate a vertex type and types and one or more attributes in the vertex type or types that qualify a vertex for the tag.

Although demonstrated in the previous example as tagging vertices once they are in the graph, the graph management system may also tag vertices as they are added to the graph. In at least one example, the graph management system may receive a request to import objects from a file to a graph, wherein the request may indicate one or more attributes associated with the objects that qualify the objects for a tag. As new vertices are generated in the graph, the attributes associated with the new vertices are processed to determine if the vertices qualify for the tag. This process may also be used to assign multiple tags, wherein each of the tags may have different attribute requirements or different conditional statements. As an example, vertices 113-115 may be imported into graph 100 from a file and tags 130-131 may be assigned as attributes for the vertices based on one or more attributes identified in the vertices.

In another example, tags can be implicitly applied to vertices as they are added to the graph. As an example, a query to the graph may generate one or more new vertices. As each of the one or more new vertices are generated, the graph management system can determine whether attributes associated with the vertex qualify for one or more tags. The vertex can qualify for the tags based on the attributes qualifying for one or more conditional rules. If a rule indicates that a tag should be added, then the tag can be added to the newly generated vertex. If no rules indicate that a tag should be added, then no tag will be added to the vertex.

FIG. 3 illustrates an operation 300 of a graph management system to identify subgraphs based on tags and respond to queries using subgraphs according to an implementation. The steps of operation 300 are referenced parenthetically in the paragraphs that follow with reference to elements of graph 100.

In operation 300, a graph management system will, in response to a request to generate a subgraph from a graph, identify (301) one or more vertices with tags associated with the request. As described previously, vertices within a graph may be assigned tags based on one or more attributes associated with the vertices. For example, a first tag may require both a first attribute and a second attribute to be present in a vertex to qualify for the first tag, wherein the first attribute and second attribute may be present in one or more different vertex types. However, a second tag may require a first attribute or a second attribute to be present to qualify for the second tag. The first and second attributes may be unique to a particular vertex type or may be present in association with multiple vertex types. In defining the request, the request can include conditional statement or Boolean expressions for the one or more attributes that qualify for the. The expressions can include any combination of ANDs, ORs, NORs, or some other expression to indicate the attributes that trigger a vertex qualifying for a particular tag. For example, an expression can indicate that a first attribute and a second attribute are required for a tag to be associated with a vertex. In another example, an expression can indicate that a vertex can include a first attribute or a second attribute to be associated with a particular tag.

Once the tags are associated with the vertices, subgraphs may be identified or created based on definitions provided from an administrator of the graph. The request to identify or generate the subgraph may indicate types of vertices to be included in the subgraph, tags for vertices to be included in the subgraph, or some other information associated with the subgraph. As an example, a request to generate a subgraph from graph 100 may indicate that all vertices with tag 130 or tag 131 should be included in the subgraph. The graph management system can then process graph 100 and identify and assign vertices 110-115 to the subgraph.

After the one or more vertices for the subgraph are identified, operation 300 further identifies (302) a query to the subgraph. The query may comprise a shortest path query, a query to identify vertices with one or more attributes, or some other query to the subgraph. In response to the request, operation 300 generates (303) a response to the query using the one or more vertices in the subgraph. Referring to the example of the subgraph with vertices associated with tags 130 or 131, a query may parse vertices 110-115 to respond to the query without identifying or processing vertex 132. The query can include attributes not associated with the tag or tags but will only traverse the vertices with the required tag or tags. Thus, a query with permissions for second tag 131, can identify any relevant attributes associated with vertices 112-115 to respond to the query, while vertices without the tag are not traversed in responding to the query.

In some implementations, when a subgraph is created, permissions may be used to provide different users with access to the subgraph. The different users may be single users or groups of users, wherein the graph management system may limit access for the users to portions of the graph that are permitted. As an example, a subgraph may be allocated to a human resources user to access specific vertices and edges, while a second subgraph may be allocated to the legal department to access different vertices and edges within the same graph. In some implementations, the query may indicate an available subgraph from a plurality of available subgraphs for the query.

In some examples, at least a portion of the vertices in the graph may be classified as untaggable, wherein even if the vertices did qualify for a tag based on attributes, a tag may not be associated with the vertices. In at least one implementation, the administrator of the computing environment may dictate that vertex types are untaggable, causing any future requests for tags to not be applied to the untaggable vertex type. Additionally, when a request is generated for a subgraph, the request may indicate a request for one or more tags and may further request that the graph include all vertices associated with one or more vertex types (e.g., a vertex type classified as untaggable). In some examples, as new vertices are added to the graphs either by user input or ingestion via a file, the new vertices may associate one or more tags based on the attributes associated with the new vertices.

Figure 4:
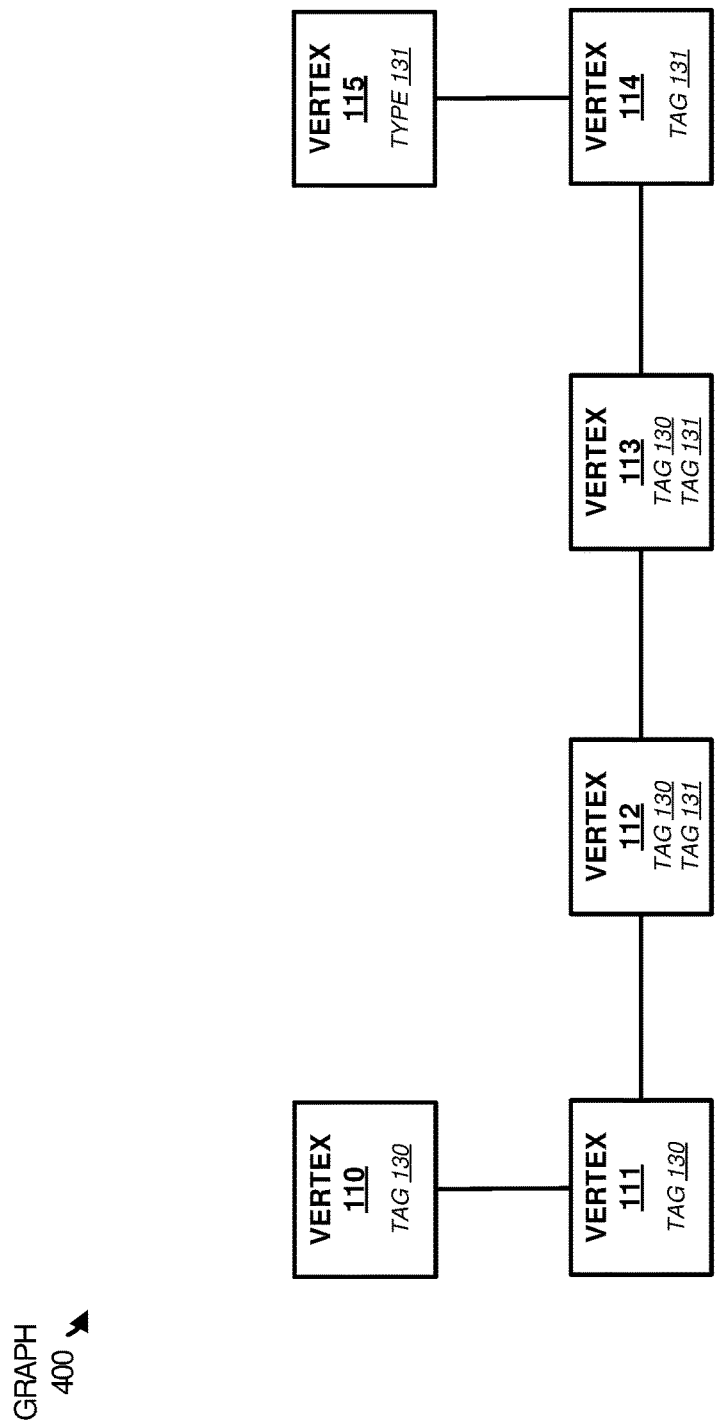
FIG. 4 illustrates a subgraph identified using tags assigned to vertices according to an implementation.

FIG. 4 illustrates a subgraph 400 generated using tags assigned to vertices according to an implementation. Subgraph 400 includes vertices 110-115 from graph 100 of FIG. 1. To identify subgraph 400, a graph management system may receive requests to generate tags in association with vertices of the graph, wherein the graph may include multiple different vertex types. The request may indicate one or more attributes in the vertices that would qualify the vertices for the tag, wherein the request can indicate a conditional expression of attributes that qualify for the tag (e.g., AND, OR, NOR, and the like). Here, vertices 110-113 are assigned tag 130 based on one or more attributes in the vertices, while vertices 112-115 are assigned tag 131 based on one or more attributes in the vertices. The attributes for each of the vertices may include attributes associated with the object that the vertex represents. For example, a user vertex representing a user in a social network may include attributes, such as a name associated with the user, a location of the user, an age of the user, or some other attribute. In some examples, the vertex type itself may be considered an attribute of the vertex.

Once tags are assigned to the vertices, the graph management system may receive a request to generate a subgraph from the graph using at least the defined tags. Here, the request indicates that a subgraph should include vertices that are tagged with either tag 130 or tag 131, while other vertices that do not include the tags are not included in the graph. Thus, vertex 116 and the corresponding edge connecting vertex 116-112 is not included in the graph. For an edge to be included, both vertices must be included in the graph.

In some implementations, vertices or vertex types may be identified by an administrator of the graph as untaggable. This prevents any tag from being applied or associated with a corresponding vertex. Thus, even if the vertex would otherwise qualify for a tag, the graph management system may prevent the tag from being associated with the vertex. Additionally, when a request is generated to create a subgraph, the request may select the untaggable vertex type to be included in the graph. Once generated, the graph management system may receive and respond to queries of the subgraph, wherein the queries may be limited to users with permissions to access the subgraph.

In at least one example, once a subgraph is generated using the tags and permissions are provided to one or more users to access the subgraph, the users may identify a second subgraph that includes a subset of the vertices from the first subgraph. In identifying the second subgraph, the user may select tags, untaggable tag types, or some other segment from the first subgraph. For example, a first subgraph may include vertices (and edges) associated with a first tag and a second tag. A user may request to generate a second subgraph that only includes edges and vertices associated with a first tag. Advantageously, an administrator may allocate permissions for a subgraph to a first user or set of users, which in turn can generate a second subgraph to allocate to additional users or users administered by the first user or set of users. This can permit users to manage tiers of subgraphs from a larger base graph.

Although demonstrated in the previous example as applying tags to existing vertices of a graph, a graph management system can add tags as data is imported to the graph. Specifically, one or more conditional rules can be defined for imported data that indicate whether a new vertex from the data should include a particular tag. Additionally, queries to the graph may generate new vertices, wherein the graph management system can assign one or more tags to a newly created vertex based on whether the vertex satisfies conditional rules associated with the tags.

Figure 5:
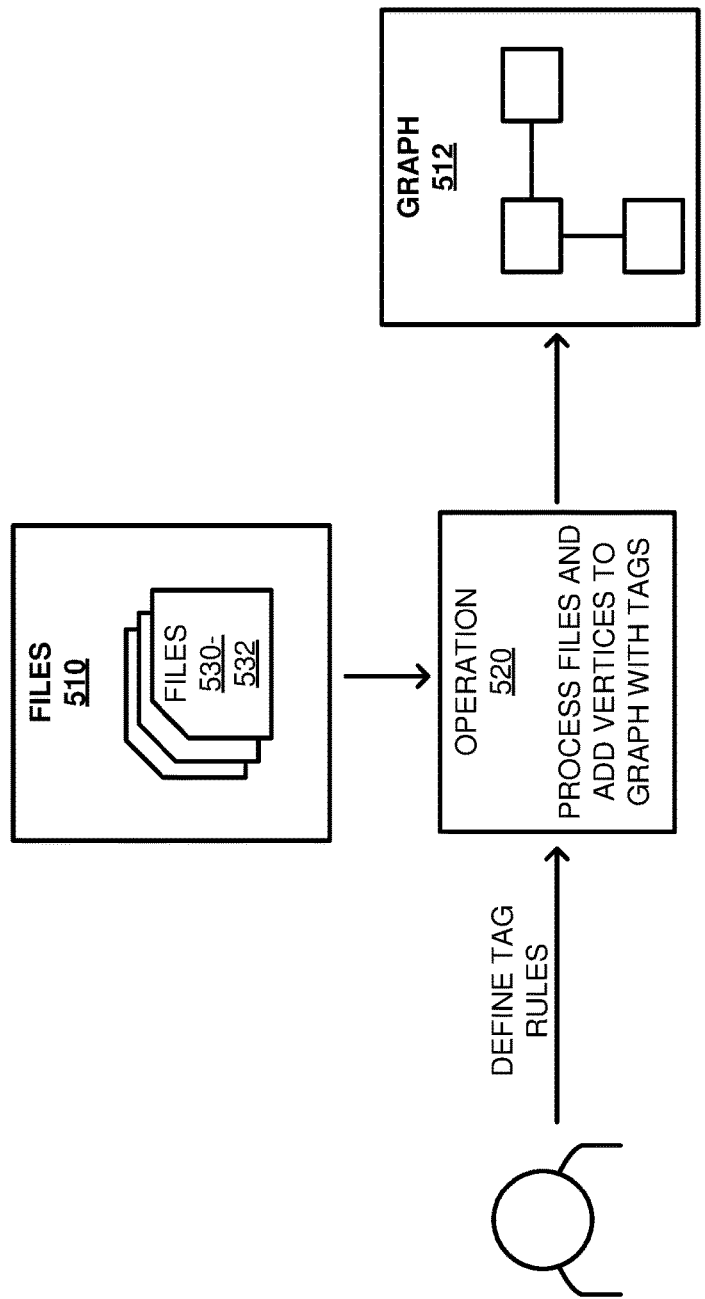
FIG. 5 illustrates an operational scenario to process imported files and tag vertices in a graph based on attributes associated with the vertices according to an implementation.

FIG. 5 illustrates an operational scenario 500 to process imported files and tag vertices in a graph based on attributes associated with the vertices according to an implementation. Operational scenario 500 includes files 510 with individual files 530-532, operation 520, and graph 512.

As described previously, tags may be allocated to vertices of a created graph based on one or more attributes in the vertices. In some implementations, the vertices or vertex types that are tagged may be defined as taggable by an administrator of the created graph, while any vertex type that is not defined as taggable may not have tags assigned to the vertex type. For example, while a user vertex type may be classified as taggable, post vertex types may be classified as untaggable. Here, rather than assigning tags to vertices that are in a created graph, operation 520 is used to process files 530-532 to incorporate new vertices (and edges) into a graph.

To support the addition of the new vertices to graph 512, an administrator may define tag rules for the files. The tag rules and other preferences provided by the administrator may define what vertex type an incorporated data object should be classified, attribute types associated with each data object, attributes required for a data object/vertex to qualify for a tag, or some other preference. For example, a file may indicate a list of users (data objects) to be added to a social network graph. The preferences from the administrator may indicate that each of the users should be added as a user vertex type, attribute types associated with each user (e.g., name, birthday, and the like), and one or more attributes that can be used to assign one or more tags to a vertex. In some implementations, the vertex type itself may be considered an attribute that can be used to assign a tag to a vertex.

Based on the preferences provided by the administrator, files 530-532 are processed and vertices and edges can be added to graph 512. In some implementations, each of the files may be associated with different preferences for classifying and tagging the vertices. For example, while preferences for file 530 may classify data objects to a first vertex type and be provided with first tag rules for tagging the vertices, preferences for file 531 may be classify data objects to a second vertex type and be provided with second tag rules for tagging the vertices. In some implementations, the same tag may be applied to vertices of different vertex types. In some implementations, vertices of a first vertex type may qualify for a tag based on first attributes, while a second vertex type may qualify for the same tag based on second attributes. In some examples, the attributes may be the same across multiple vertex types (e.g., location attribute for user vertex type and object vertex type). Each of the rules can be provided as a conditional, wherein a vertex is assigned a tag associated with the rule if the conditional is true for the vertex.

In some implementations, an administrator may tag vertices at different stages, wherein tagging can occur on an existing vertices in graph or when data is ingested to be added to the graph. For example, an administrator may define one or more first attributes for the graph management system to traverse the graph and assign a tag to the vertices in the graph that qualify using the one or more first attributes. The administrator may then define one or more second attributes that can qualify a vertex for the tag, wherein the attributes may be applied to the existing vertices or to vertices that are manually generated or ingested via a file. Moreover, the first and second attributes may be applied to new vertices as they are added to the graph to determine whether the new vertices qualify for the tag. Thus, the conditional rules for a tag can be applied for an existing graph, can be applied to ingesting data, or can be applied to newly created vertices as part of a query to the graph.

Figure 6:
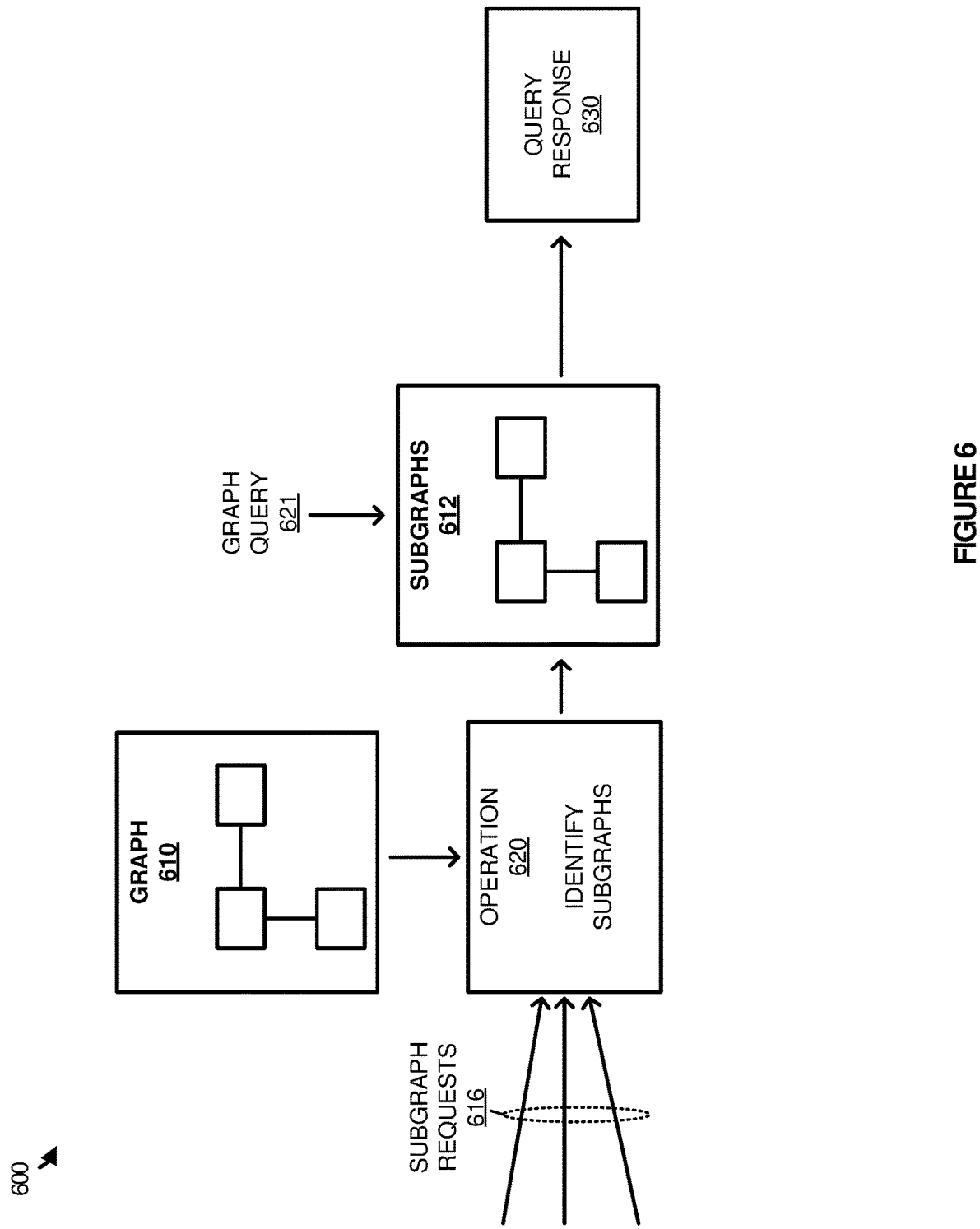
FIG. 6 illustrates an operational scenario of processing subgraph requests and graph queries according to an implementation.

FIG. 6 illustrates an operational scenario 600 of processing subgraph requests and graph queries according to an implementation. Operational scenario 600 includes graph 610, graph requests 616, subgraphs 612, operation 620, graph query 621, and query response 630. Although demonstrated as separate from graph 610, subgraphs 612 are merely depicted as separate for clarity. Subgraphs 612 are defined from graph 610 based on one or more tags identified in association with each vertex in graph 610.

In operational scenario 600, a graph management system may perform operation 620 that identifies subgraphs 612 in graph 610. The subgraph requests may indicate vertex types to be included in a subgraph, tags to be included in a subgraph, or some other information to identify vertices and edges in a subgraph. For example, an administrator of a graph representing data for a social network may request that all user type vertices are present in a subgraph and all post type vertices associated with a particular tag are also in the subgraph. Tags may be applied in graph 610 based on conditional statements that generate tags for vertices when the vertices satisfy the conditional statements. A conditional statement can require one or more attributes to qualify for a tag and can be applied across multiple vertex types. For example, a user type vertex may be allocated the same tag as a post type vertex in a social network graph. In some implementations, the administrator may limit which vertex types are permitted to be tagged, wherein a request to apply a tag to vertices in the graph will only search vertices that classified as taggable.

Here, in response to graph requests 616, subgraphs 612 are identified based on preferences for each of the subgraphs. Once the subgraphs are created, a graph query 621 can be generated and applied to a subgraph, wherein the query may comprise a shortest path query, a query to identify specific information from attributes of the subgraph, or some other query. In at least one implementation, the subgraphs may be associated with permissions, wherein the permissions may dictate the user or users that can access and query the subgraph. For example, while a first user may query a first subgraph of the graph, a second user may query a second subgraph of the graph. The users may provide credentials such as keys, usernames, and the like to the graph management system and the graph management system may permit access to specific portions of the graph. In one implementation, users with access to a subgraph may generate a graph query 621 for a subgraph. The query may be used to identify the shortest path, the existence of objects in the graph, the existence of attributes in the graph, or some other query to the graph. Rather than traversing the entire graph, the graph management system may generate query response 630 using the individual subgraph and associated vertices and edges.

Figure 7:
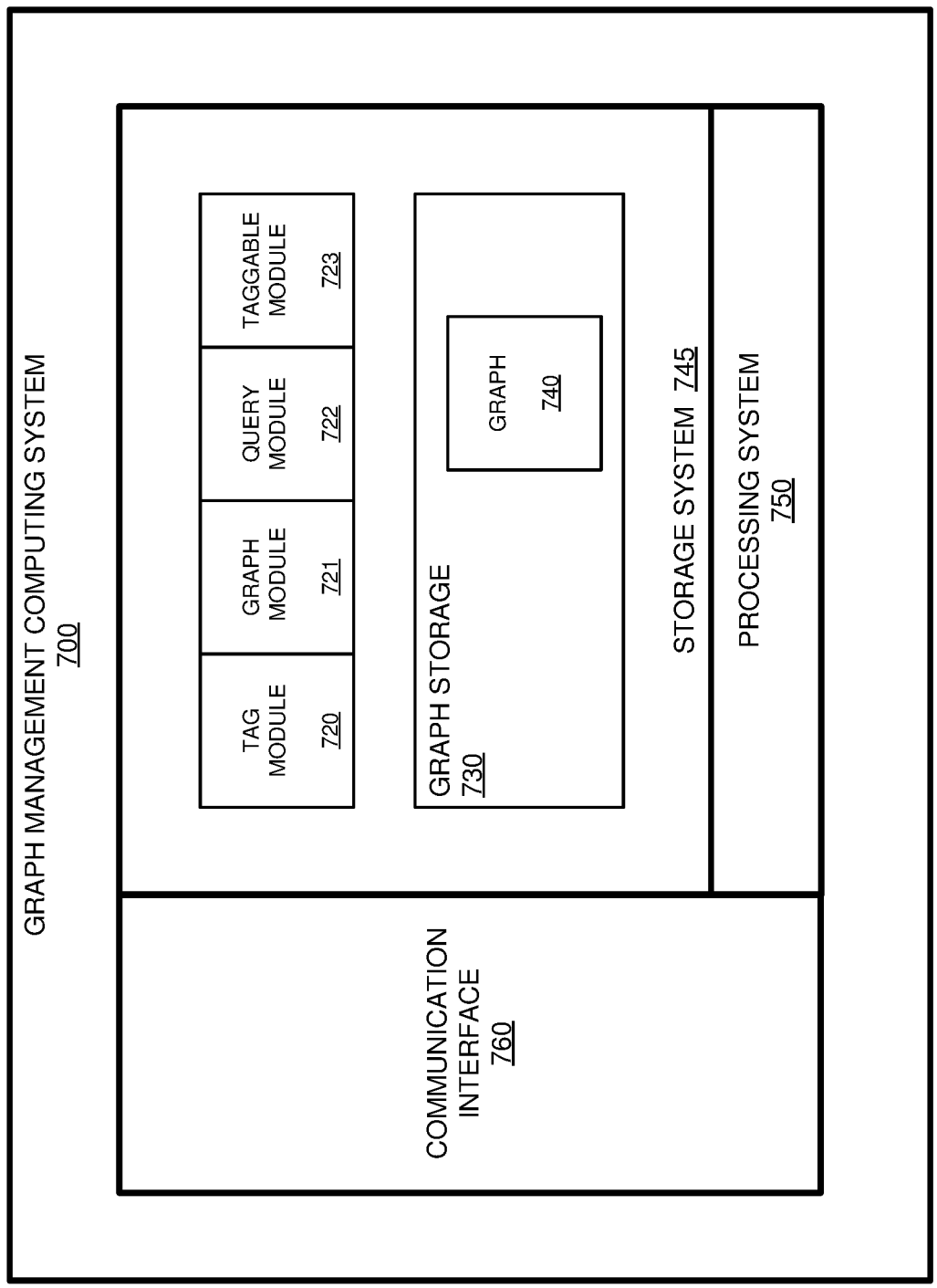
FIG. 7 illustrates a graph management computing system capable of managing tags for graphs according to an implementation.

FIG. 7 illustrates a graph management computing system capable of managing tags for graphs according to an implementation. Graph management computing system 700 is representative of any computing system or systems with which the various operational architectures, processes, scenarios, and sequences disclosed herein for a graph management system can be implemented. Graph management computing system 700 includes storage system 745, processing system 750, and communication interface 760. Processing system 750 is operatively linked to communication interface 760 and storage system 745. Communication interface 760 may be communicatively linked to storage system 745 in some implementations. Graph management computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 may be configured to communicate with one or more end user computing systems in some implementations, wherein the communication interface may transfer and receive information related to graphs in graph storage 730.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises tag module 720, graph module 721, query module 722, and taggable module 723, wherein storage system 745 further includes graph storage 730 for graph 740. The operating software on storage system 745 may further include an operating system, utilities, drivers, network interfaces, applications, or some other type of software. When read and executed by processing system 750 the operating software on storage system 745 directs graph management computing system 700 to operate as described herein.

In one implementation, tag module 720 directs processing system 750 to identify a request to add a tag one or more vertices of a plurality of vertices in a graph 740, wherein the request indicates one or more attributes to qualify for the tag and wherein the plurality of vertices comprise a plurality of vertex types. In response to the request, tag module 720 further directs processing system 750 to identify the one or more vertices in the graph with the one or more attributes, wherein the one or more vertices comprise two or more vertex types of the plurality of vertex types and the tag to the one or more vertices, wherein the tag comprises an attribute associated with the one or more vertices. The process may be repeated for as many tags as desired for the graph. In at least one implementation, rather than tagging existing vertices in the graph, tag module 720 may direct processing system 750 to tag vertices as the data objects are ingested. An administrator may define one or more attributes to qualify for the tag, ingest the data objects, and add the data objects as vertices in the graph with the tag if the vertices qualify for the tag. The ingestion tagging operation, like the existing graph tagging operation, can define conditional expressions that, when true, create a tag for new vertices added during the ingestion of data.

As the vertices are tagged in graph 740, graph module 721 directs processing system 750 to receive a request to generate or identify a subgraph from the graph, wherein the request indicates at least one tag to be included in the subgraph. The request may further indicate vertex types to be included in the graph or some other information indicating vertices to be included in the graph. Edges can also be included in the subgraph based on the inclusion of both end vertices. In some implementations, once a subgraph is generated, permissions may be associated with the subgraph that permits user to access, edit, or query the graph. For example, an administrator may permit a first user to access a first subgraph, while a second user is permitted to access a second subgraph. The subgraphs may include separate vertices and edges or may share at least one vertex and edge. After a graph is generated, query module 722 may direct processing system 750 receive queries to the subgraph and generate response to the queries.

In one example, taggable module 723 directs processing system 750 to permit an administrator to define the different types of vertices that are capable of being tagged. For example, a social media graph may have different vertex types that represent users, posts of the users, images for the users, or some other data type. For each of the different types of vertices, an administrator may indicate whether the vertex type is taggable. Thus, while post vertices may be tagged, user vertices may be defined as untaggable. Once a subgraph is requested, the user may select an entire vertex type to be included in the subgraph, vertices with one or more tags to be included in the subgraph, or some other request to include vertices in the subgraph.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
identifying one or more requests to add one or more tags to a plurality of vertices in a graph stored on a computing device, wherein each request of the one or more requests for a tag of the one or more tags indicates a conditional expression that defines one or more attributes to qualify for the tag, and wherein the plurality of vertices comprise one or more types;
for each tag of the one or more tags:
identifying one or more vertices in the graph that satisfy the conditional expression indicated for the tag; and
assigning the tag to the one or more vertices, wherein the tag comprises an attribute associated with the one or more vertices;
obtaining a second request to generate a subgraph from the graph, wherein the request indicates a second conditional expression for a subset of tags of the one or more tags that qualify for the subgraph;
selecting a subset of vertices in the graph to assign to the subgraph that satisfy the second conditional expression; and
selecting a subset of edges from a plurality of edges in the graph for the subgraph based on each edge in the subset of edges connecting two vertices in the subset of vertices.

2. The method of claim 1, wherein the second conditional expression indicates a requirement that a first tag of the one or more tags and a second tag of the one or more tags is required for a vertex to qualify for the subgraph.

3. The method of claim 1 further comprising:
receiving a query to the subgraph; and
generating a response to the query using the subset of vertices and the subset of edges selected for the subgraph.

4. The method of claim 1, wherein the second conditional expression indicates a requirement that a first tag of the one or more tags or a second tag of the one or more tags is required for a vertex to qualify for the subgraph.

5. The method of claim 1 further comprising allocating permissions to one or more users to access the subgraph.

6. The method of claim 1, wherein the graph comprises a social network graph or a transaction graph.

7. A computing apparatus comprising:
a storage system;
a processing system operatively coupled to the storage system; and
program instructions stored on the storage system that, when executed by the processing system, direct the computing apparatus to:
identify one or more requests to add one or more tags to a plurality of vertices in a graph stored on a computing device, wherein each request of the one or more requests for a tag of the one or more tags indicates a conditional expression that defines one or more attributes to qualify for the tag, and wherein the plurality of vertices comprise one or more types;
for each tag of the one or more tags:
identify one or more vertices in the graph that satisfy the conditional expression indicated for the tag; and
assign the tag to the one or more vertices, wherein the tag comprises an attribute associated with the one or more vertices;
obtain a second request a second request to generate a subgraph from the graph, wherein the request indicates a second conditional expression for a subset of tags of the one or more tags that qualify for the subgraph;
select a subset of vertices in the graph to assign to the subgraph that satisfy the second conditional expression; and
select a subset of edges from a plurality of edges in the graph for the subgraph based on each edge in the subset of edges connecting two vertices in the subset of vertices.

8. The computing apparatus of claim 7, wherein the second conditional expression indicates a requirement that a first tag of the one or more tags and a second tag of the one or more tags is required for a vertex to qualify for the subgraph.

9. The computing apparatus of claim 7, wherein the program instructions further direct the computing apparatus to:
receive a query to the subgraph; and
generate a response to the query using the subset of vertices and the subset of edges selected for the subgraph.

10. The computing apparatus of claim 7, wherein the second conditional expression indicates a requirement that a first tag of the one or more tags or a second tag of the one or more tags is required for a vertex to qualify for the subgraph.

11. The computing apparatus of claim 7, wherein the program instructions further direct the computing apparatus to allocate permissions to one or more users to access the subgraph.

12. The computing apparatus of claim 7, wherein the graph comprises a social network graph or a transaction graph.

13. An apparatus comprising:
one or more non-transitory computer readable storage media; and
program instructions stored on the one or more non-transitory computer readable storage media that, when executed by at least one processor, direct the at least one processor to:
identify one or more requests to add one or more tags to a plurality of vertices in a graph stored on a computing device, wherein each request of the one or more requests for a tag of the one or more tags indicates a conditional expression that defines one or more attributes to qualify for the tag, and wherein the plurality of vertices comprise one or more types;
for each tag of the one or more tags:
identify the one or more vertices in the graph that satisfy the conditional expression; and
assign the tag to the one or more vertices, wherein the tag comprises an attribute associated with the one or more vertices;
obtain a second request a second request to generate a subgraph from the graph, wherein the request indicates a second conditional expression for a subset of tags of the one or more tags that qualify for the subgraph;
select a subset of vertices in the graph to assign to the subgraph that satisfy the second conditional expression; and select a subset of edges from a plurality of edges in the graph for the subgraph based on each edge in the subset of edges connecting two vertices in the subset of vertices.

14. The apparatus of claim 13, wherein the second conditional expression indicates a requirement that a first tag of the one or more tags and a second tag of the one or more tags is required for a vertex to qualify for the subgraph.

15. The apparatus of claim 13, wherein the program instructions further direct the at least one processor to:
   receive a query to the subgraph; and
   generate a response to the query using the subset of vertices and the subset of edges selected to the subgraph.

16. The apparatus of claim 13, wherein the second conditional expression indicates a requirement that a first tag of the one or more tags or a second tag of the one or more tags is required for a vertex to qualify for the subgraph.

17. The apparatus of claim 13, wherein the program instructions further direct the at least one processor to allocate permissions to one or more users to access the subgraph.

18. The apparatus of claim 13, wherein the graph comprises a social network graph or a transaction graph.

* * * * *